United States Patent
Mankovskii et al.

(10) Patent No.: US 10,133,614 B2
(45) Date of Patent: Nov. 20, 2018

(54) ANOMALY CLASSIFICATION, ANALYTICS AND RESOLUTION BASED ON ANNOTATED EVENT LOGS

(71) Applicant: CA, INC., New York, NY (US)

(72) Inventors: Serguei Mankovskii, San Ramon, CA (US); Steven Greenspan, Dallas, TX (US); Maria Velez-Rojas, San Jose, CA (US)

(73) Assignee: CA, Inc., New York, NY (US)

( * ) Notice: Subject to any disclaimer, the term of this patent is extended or adjusted under 35 U.S.C. 154(b) by 290 days.

(21) Appl. No.: 14/666,665

(22) Filed: Mar. 24, 2015

(65) Prior Publication Data

US 2016/0283310 A1    Sep. 29, 2016

(51) Int. Cl.
| | |
|---|---|
| G06F 11/00 | (2006.01) |
| G06F 11/07 | (2006.01) |
| G06F 11/34 | (2006.01) |
| H04L 12/24 | (2006.01) |

(52) U.S. Cl.
CPC ...... G06F 11/0709 (2013.01); G06F 11/0781 (2013.01); G06F 11/34 (2013.01); G06F 11/3409 (2013.01); G06F 11/3476 (2013.01); H04L 41/00 (2013.01); G06F 11/3452 (2013.01); G06F 2201/81 (2013.01); G06F 2201/86 (2013.01)

(58) Field of Classification Search
CPC .............. G06F 11/0793; G06F 11/3082; G06F 11/3452; G06F 2201/86; H04L 41/0631
See application file for complete search history.

(56) References Cited

U.S. PATENT DOCUMENTS

| | | | | |
|---|---|---|---|---|
| 6,198,885 B1 * | 3/2001 | Budnik | ............... | G03G 15/5041 |
| | | | | 399/24 |
| 6,446,017 B1 * | 9/2002 | Skidmore | ............... | G06Q 10/06 |
| | | | | 702/118 |
| 6,851,105 B1 * | 2/2005 | Coad | ......................... | G06F 8/20 |
| | | | | 717/106 |
| 6,931,622 B1 * | 8/2005 | Aldrich | .................. | G06N 5/025 |
| | | | | 706/45 |
| 7,627,837 B2 * | 12/2009 | Zhang | ....................... | G03F 1/36 |
| | | | | 716/106 |
| 7,756,593 B2 * | 7/2010 | Miller | .................... | G08B 21/12 |
| | | | | 340/3.1 |
| 7,818,723 B2 * | 10/2010 | AliKacem | ........... | G06F 11/3668 |
| | | | | 717/131 |
| 8,069,374 B2 * | 11/2011 | Panigrahy | ........... | G06F 11/0709 |
| | | | | 714/38.1 |
| 8,341,106 B1 * | 12/2012 | Scolnicov | .............. | G06N 7/005 |
| | | | | 702/50 |

(Continued)

*Primary Examiner* — Loan L. T. Truong
(74) *Attorney, Agent, or Firm* — Vierra Magen Marcus LLP

(57) ABSTRACT

Operational event loggings and operational alarm productions within a running multiserver data processing system are automatically and repeatedly sampled and co-associated with one another so as to build annotated logs that can be used by post-process analytics for filling in mappings thereof into an anomalies versus parameters mapping space and for keeping track of unusual changes in the mappings or their rates where the unusual changes can be indicative of emerging new problems of significance within the system.

20 Claims, 7 Drawing Sheets

(56) References Cited

U.S. PATENT DOCUMENTS

| | | | | |
|---|---|---|---|---|
| 8,693,021 B2* | 4/2014 | Sampath | G03G 15/55 | 358/1.12 |
| 8,892,484 B2* | 11/2014 | Sipple | G06N 5/02 | 706/21 |
| 9,396,253 B2* | 7/2016 | Porpora | G06F 17/30699 | |
| 9,762,758 B1* | 9/2017 | Wang | H04N 1/32625 | |
| 2003/0086536 A1* | 5/2003 | Salzberg | H04M 3/22 | 379/15.02 |
| 2004/0158435 A1* | 8/2004 | Slates | G05B 23/0235 | 702/185 |
| 2004/0199828 A1* | 10/2004 | Cabezas | G06F 11/0748 | 714/39 |
| 2008/0052757 A1* | 2/2008 | Gulati | H04L 41/0809 | 726/1 |
| 2008/0068183 A1* | 3/2008 | Diamant | G06F 21/31 | 340/574 |
| 2008/0276131 A1* | 11/2008 | Bantz | G06F 11/0748 | 714/47.2 |
| 2008/0319940 A1* | 12/2008 | Garg | H04L 12/66 | |
| 2009/0183023 A1* | 7/2009 | Rathunde | G06F 11/0709 | 714/4.2 |
| 2009/0226162 A1* | 9/2009 | Cheng | H04L 41/0654 | 398/3 |
| 2009/0287720 A1* | 11/2009 | Herter | G06F 11/3006 | |
| 2009/0292948 A1* | 11/2009 | Cinato | H04L 12/2602 | 714/26 |
| 2009/0319656 A1* | 12/2009 | Yang | H04L 41/065 | 709/224 |
| 2010/0100774 A1* | 4/2010 | Ding | G06F 11/3636 | 714/45 |
| 2010/0286490 A1* | 11/2010 | Koverzin | G06F 19/3418 | 600/301 |
| 2011/0039237 A1* | 2/2011 | Skare | G05B 23/0267 | 434/118 |
| 2011/0051992 A1* | 3/2011 | Cobb | G06K 9/00771 | 382/100 |
| 2011/0107418 A1* | 5/2011 | Bhagwan | G06F 21/604 | 726/22 |
| 2011/0265064 A1* | 10/2011 | Hadar | G06F 17/30985 | 717/121 |
| 2012/0130724 A1* | 5/2012 | Flegel | G06Q 40/06 | 705/1.1 |
| 2012/0169458 A1* | 7/2012 | Dubois, Jr. | G07C 9/00571 | 340/5.3 |
| 2012/0244510 A1* | 9/2012 | Watkins, Jr. | G09B 7/00 | 434/362 |
| 2013/0173202 A1* | 7/2013 | Boerhout | G06F 15/00 | 702/113 |
| 2013/0261914 A1* | 10/2013 | Ingram | B64C 39/024 | 701/70 |
| 2014/0146662 A1* | 5/2014 | Okabe | H04L 41/0686 | 370/225 |
| 2014/0219107 A1* | 8/2014 | Racz | H04L 41/0631 | 370/242 |
| 2015/0006459 A1* | 1/2015 | Lv | G06N 5/04 | 706/47 |
| 2015/0046757 A1* | 2/2015 | Brew | G06F 11/3452 | 714/47.3 |
| 2015/0092550 A1* | 4/2015 | Christian | H04L 47/31 | 370/235 |
| 2015/0149721 A1* | 5/2015 | Kannan | G06F 12/0811 | 711/122 |
| 2015/0256639 A1* | 9/2015 | Chow | H04L 67/22 | 709/213 |
| 2015/0308655 A1* | 10/2015 | Holmes | F21V 5/045 | 362/235 |
| 2016/0094401 A1* | 3/2016 | Anwar | H04L 41/142 | 709/223 |
| 2016/0132433 A1* | 5/2016 | Hayashi | G06F 12/0866 | 711/118 |
| 2016/0142435 A1* | 5/2016 | Bernstein | H04L 63/1425 | 726/23 |
| 2016/0217054 A1* | 7/2016 | Hadar | G06F 17/30985 | |
| 2016/0292065 A1* | 10/2016 | Thangamani | G06F 8/65 | |
| 2016/0352759 A1* | 12/2016 | Zhai | H04L 63/1416 | |
| 2016/0371489 A1* | 12/2016 | Puri | G06F 17/30563 | |
| 2016/0378648 A1* | 12/2016 | Ekambaram | G06F 11/3692 | 714/38.1 |
| 2017/0177461 A1* | 6/2017 | Altman | G06F 11/3612 | |

* cited by examiner

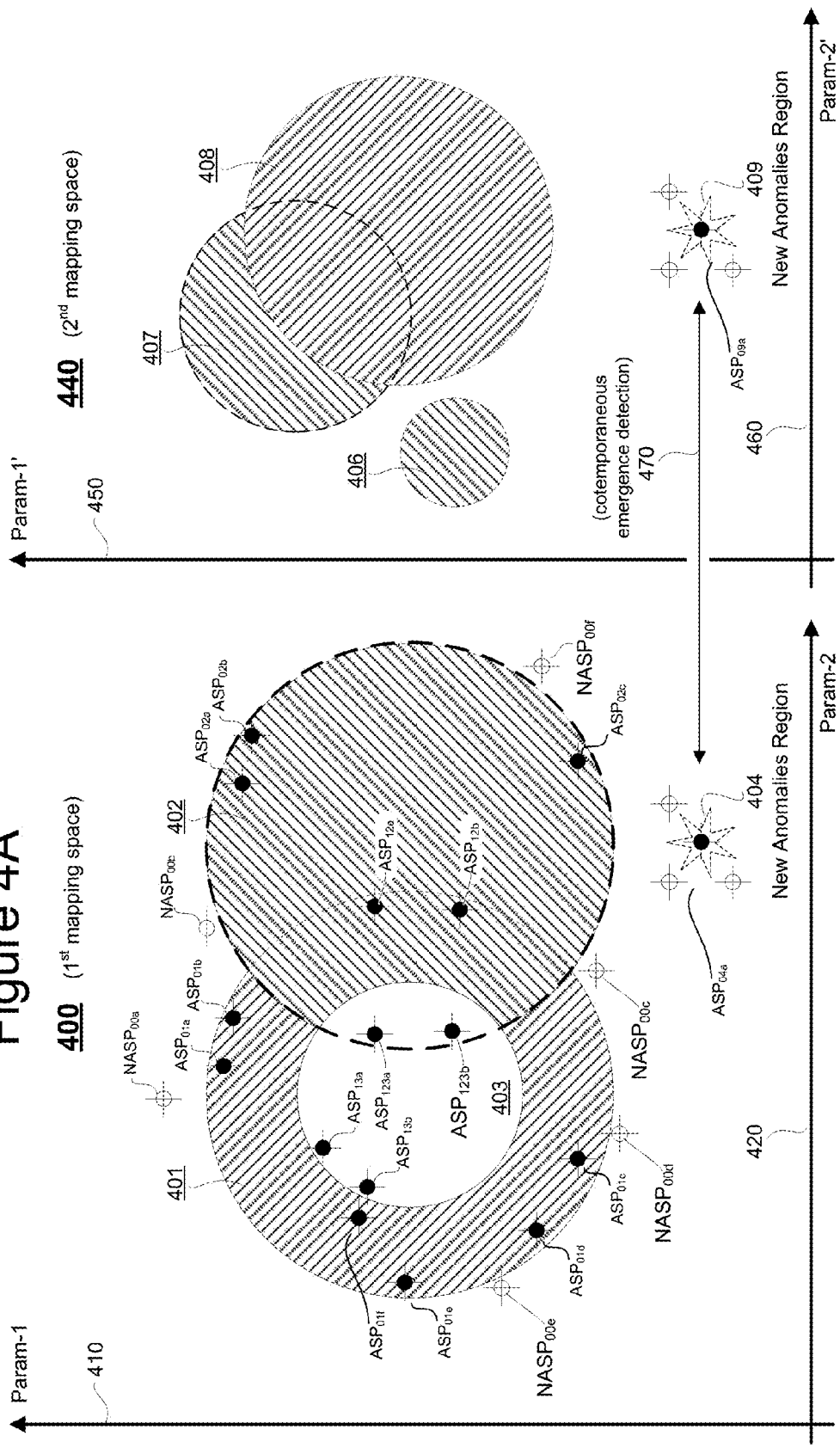

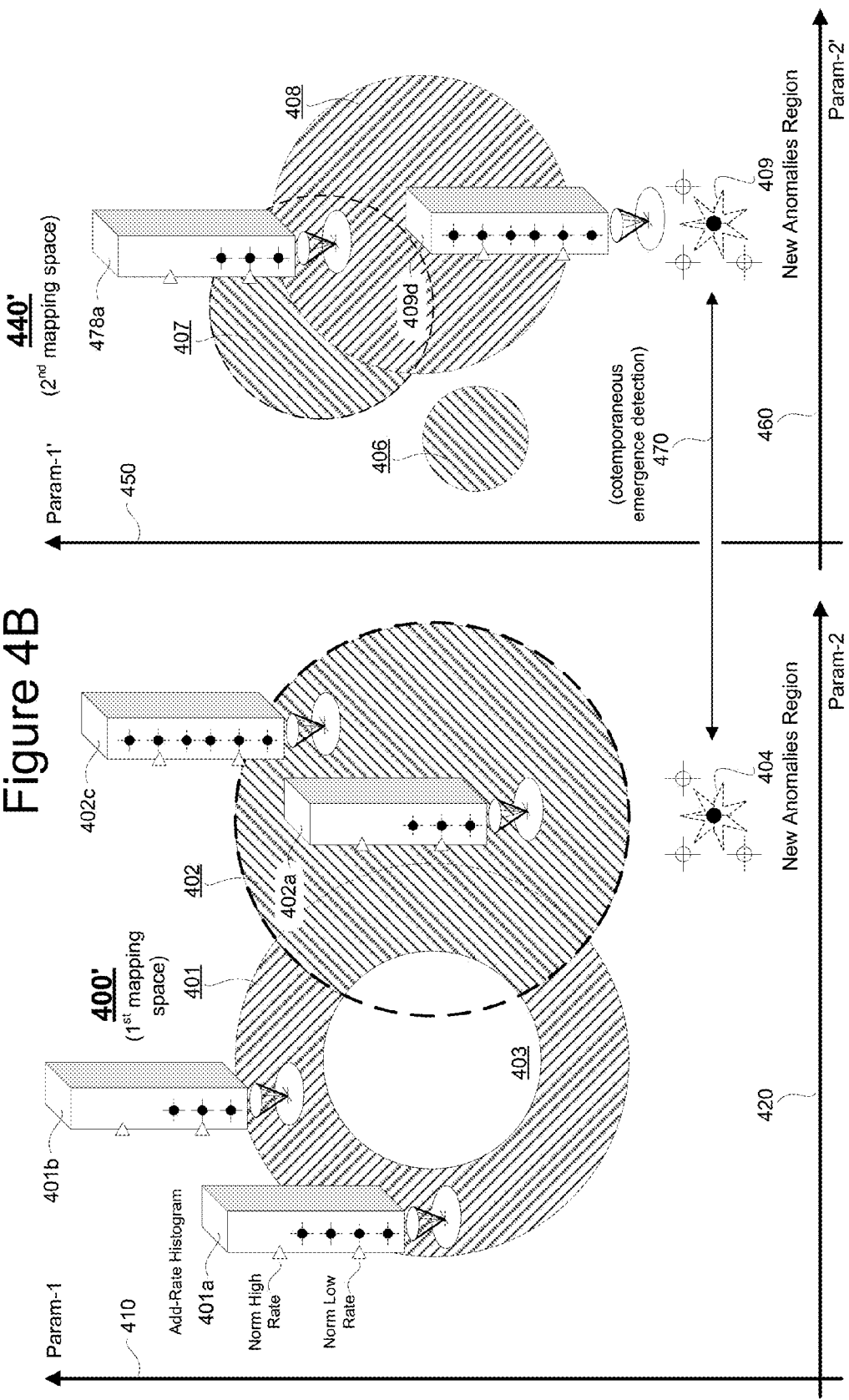

500

ANOMALY CLASSIFICATION, ANALYTICS AND RESOLUTION BASED ON ANNOTATED EVENT LOGS

FIELD OF DISCLOSURE

The present disclosure relates generally to multi-device systems such as used in integrated client-server/internet/cloud computing environments where plural physical and virtual data processing machines and/or other resource consuming constructs are disposed in respective sections of an interconnected fabric of client devices (e.g., smartphones), servers (real and virtual), communication resources (e.g., wired and wireless), data storage resources (e.g., databases) and so on for carrying out desired data processing and data communicating operations. The disclosure relates more specifically to machine-implemented methods for automatically determining what constitutes emerging anomalous behavior of significance in such multi-device systems and for automatically providing machine-implemented adaptive classification of anomalies and proactive resolutions.

DESCRIPTION OF RELATED TECHNOLOGY

In large-scale multi-device systems such as those using "cloud computing" (e.g., cloud based servicing of requests received from large numbers of mobile and/or stationary client machines), many things can go wrong. Communication channels may break down or experience excessive interference. Data storage units may begin to exhibit unacceptable latencies or difficulties in reading and/or writing desired data portions. Power supplies and/or their fans may fail or worse yet, slowly begin to intermittently degrade. Magnetic or other kinds of disk drive systems may crash or worse yet, slowly begin to intermittently degrade. Electrical interconnects may develop intermittent opens or shorts that slowly become more frequent over time. DRAM memory chips may experience unusually large numbers of soft errors. Software program operations may go awry. These are merely illustrative examples.

Operations management teams who manage day to day operations of such large-scale multi-device systems (e.g., cloud based systems) often wish to proactively get ahead of emerging problems and nip them in the bud so that the latter do not become catastrophic system failures. When a catastrophic system crash occurs, commercial and/or other system users may experience an inability to use mission critical hardware and/or software. Examples of mission critical system users include hospitals and/or other medical service providing institutions, banks and/or other financial service providing institutions, police and/or other security service providing organizations and so on. Needless to say, system crashes for such entities may have disastrous consequences.

Given the severity of consequences in many failure scenarios, it is desirable to develop automated analytics systems that automatically learn to distinguish between cases where normal or routine anomalies of the day to day system operations kind are occurring and where less routine but significant anomalies begin to emerge within the noise background of the insignificant, normal anomalies of the day to day kind. System management teams should be automatically alarmed when truly significant anomalies begin to appear as opposed to being alarmed for every one of the routine day to day kinds of anomalies. Too high of a rate of alarms for insignificant routine problems can interfere with efficient operation of the large-scale multi-device system. More specifically, false alarms and/or alarms for insignificant events can drive up operational costs, exhaust operational personnel and render them insensitive to alarmed situations where there actually is a truly significant problem that is emerging and must be quickly taken care of. This can be considered a classification problem.

The question presents as how to form an automated system that adaptively learns to distinguish between "truly" significant ones of emerging problems and those that are routine events within the normal day-to-day operations of the system. In the past operators relied on historical performance pictures (performance snapshots), regression analysis (e.g., determining what is "normal" or average based on past performances) and then detecting supposedly-significant deviations from the historical normals (from the regression-produced, "normal" curves).

There are several problems with such a regression analysis and deviation detect approach. First it is not definitively known, and thus primarily guess work as to what should be the observed driving and driven variable(s) of a regression analysis. Should hour of the day be a driving factor? Should it be day of the week? Should it be number of logged-in users or combinations of these and/or other possible driving variables? Then of course there is also the question of what the driven variable(s) of the regression analysis should be. In other words, is there a true cause and effect relationship between selected driving and correspondingly selected driven factors? Possible, but not limiting examples of options for driven factors include CPU utilization percentage or absolute rates, DRAM utilization percentages/rates, disk drive utilization percentages/rates, I/O utilization, power consumption, and so on. Then, for the regression analysis itself, there are many possible algorithms to pick among, including; but not limited to, linear regression, parabolic regression, piece-wise linear regression, piece-wise parabolic regression, higher ordered continuous and/or piece-wise such power series regression formulas or mixes thereof. Additionally, operators may arbitrarily choose to use merely a single driven and a single driving variable, or they may assume plural driving factors for a single driven variable or alternatively multiple driven and driving variables. They may further choose different widths and sampling rates for their regression analysis windows (e.g., as taken over what length of time, at what sampling rate, etc.?). With all of these, it is not definitively known what to pick, and thus it is primarily guess work (often falsely justified as being "educated" guess work). It is to be understood that the description given here does not mean that any part or all of this was recognized heretofore.

After specific ones among an astronomically large range of possible regression methods are picked for use with selected driven/driving variables and after operators have produced a supposedly "normal" behavior curve (or curves or N-dimensional "normal behavior" surfaces), the question still remains as to what is the amount of deviation and/or what are the number of times that such deviation(s) need to be present in order to declare the corresponding event(s) as truly significant anomalies that are worthy of having follow up work conducted for them. The follow up work may include identifying the alleged root cause(s) for the declared-as-significant anomaly and changing the system so as to supposedly "fix" the root cause(s) without creating additional problems.

As indicated above, it is to be understood that this background of the technology section is intended to provide useful background for understanding the here disclosed technology and as such, this technology background section may include ideas, concepts or recognitions that were not part of what was known or appreciated by those skilled in the pertinent art prior to corresponding invention dates of subject matter disclosed herein. In particular it is believed that prior art artisans did not appreciate wholly or at least in part all of the problems associated with reliance on the regression analysis and deviation detect approach. Moreover, it is believed that prior art artisans did not appreciate wholly or at least in part that there are other options to pursue.

SUMMARY

Structures and methods may be provided in accordance with the present disclosure for providing a more knowledgeable kind of machine automated, adaptive learning for distinguishing between significant ones of emerging anomalies in system behavior that are worthy of specially alarming for and those that are merely routine anomalies.

More specifically, in accordance with one aspect of the present disclosure, a machine-implemented method is provided for keeping track in an anomalies versus parameters mapping space of previously identified and emerging anomalies of a data processing system where the method comprises: running a first section of the data processing system where the first section includes a section alarming subsystem and a section behaviors logging subsystem, the section alarming subsystem being configured to generate alarms for alarm-worthy events within the first section, the section behaviors logging subsystem being configured to generate a log of monitored behaviors within the first section; logically co-associating recently logged behaviors of the generated log produced by the section behaviors logging subsystem with substantially cotemporaneous alarms generated by the section alarming subsystem and recording the logical associations; building an annotated log comprised of the logically co-associated logged behaviors and substantially cotemporaneous alarms; using the annotated log to keep track in a corresponding first anomalies versus parameters mapping space of previously identified as routine and emerging anomalies of the first section of the data processing system; and automatically repeating said co-associating, building and using steps while the first section of the data processing system continues to run.

Other aspects of the disclosure will become apparent from the below detailed description.

BRIEF DESCRIPTION OF THE DRAWINGS

The below detailed description section makes reference to the accompanying drawings, in which:

FIG. 4A is a first Venn like diagram illustrating how to map normal or routine day-to-day anomalies based on their occurrences within a multi-parameter space for respective sections of a large system and how to spot emergence of multi-sectional anomalies;

FIG. 4B is a second Venn like diagram similar to that of FIG. 4A and further illustrating how to map histogramic behaviors in various regions of the multi-parameter space;

DETAILED DESCRIPTION

Figure 1:
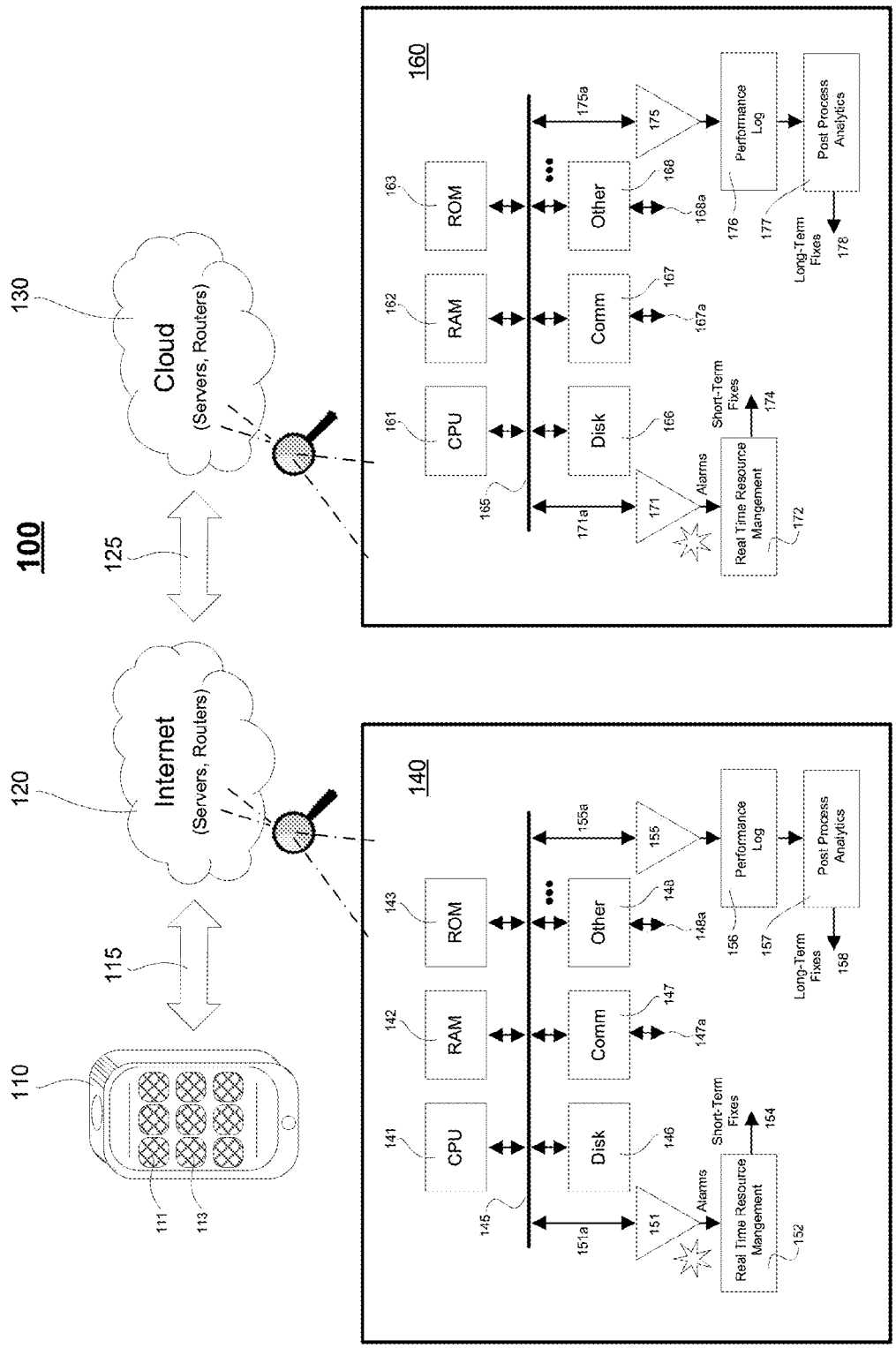
FIG. 1 is a block diagram schematically showing an interconnected multi-device system having embedded alarming and logging subsystems.

FIG. 1 is a block diagram showing an integrated client-server/internet/cloud system 100 (or more generically, an integrated multi-device system 100) to which the here disclosed technology may be applied. The illustrated system 100 is merely exemplary and comprises one or more client devices 110 (only one shown in the form of a wireless smartphone but understood to represent many and not only of the smartphone client kind); one or more wired and/or wireless communication fabrics 115 (only one shown in the form of a wireless bidirectional interconnect) coupling the client(s) 110 to networked servers 120 (not explicitly shown) where the latter may operatively couple by way of further wired and/or wireless communication fabrics 125 (not explicitly shown) to further networked servers 130 (not explicitly shown). The second set of networked servers 130 is depicted as a "cloud" 130 for the purpose of indicating a nebulous and constantly shifting, evolving set of hardware, firmware and software resources. As those skilled in the art of cloud computing will appreciate, the "cloud" 130 may be implemented as reconfigurable virtual servers and virtual software modules implemented across a relatively seamless web of physical servers, storage units (including flash BIOS units), communication units and the like such that failure of specific units within the physical layer are overcome by shifting the supported virtual resources to spare other support areas in the physical layer. Because of sheer size and also this constantly shifting and self-reconfiguring fabric of resources, it can be very difficult to spot emerging problems of significance.

A quick and introductory walk through FIG. 1 is first provided here so that readers may appreciate the bird's eye lay of the land, so to speak. Item 111 represents a first user-activatable software application (first mobile app) that may be launched from within the exemplary mobile client 110 (e.g., smartphone, but could instead be a tablet, a laptop, a wearable computing device; i.e. smartwatch). Item 113 represents a second such user-activatable software application (second mobile app) and generally there are many more. Each client-base application (e.g., 111, 113) can come in the form of nontransiently recorded digital code (i.e. object code or source code) that is defined and stored in a memory for instructing a target class of data processing units to perform in accordance with client-side defined application programs ('mobile apps' for short) as well as to cooperate with server side applications implemented on the other side of communications link 115.

One example of a first mobile app (e.g., 111) could be one that has been designed to service a particular business organization (e.g., Book Store #1) in accordance with how that particular business organization chooses to organize itself. For example if a user (not shown) of the mobile client 110 wants to browse through a collection of new books offered by the business organization and perhaps buy some, the user may first be asked to download the first mobile app (e.g., 111) into his/her client device 110. This will typically involve a download of app code from the Internet 120, through a wireless portion of the communications link 115 and an operative coupling ("installation") of the downloaded code with client-side operating system code (OS) that typically has also been downloaded via to link 115 into the client device 110. Next the user activates a book-store browse feature of the first app 111 and it causes service requests to go out through link 115 to targeted modules and/or servers within the Internet portion 120. Those targeted modules and/or servers may offload (delegate) parts of their data processing, storing and/or routing tasks to yet further resources within the "cloud" 130 by way of the illustrated, second communications link 125. (In actuality, the "cloud" 130 may be embedded or enmeshed within Internet 120 and the first and second communications links 115, 125 may be inseparably integrated one with the other. They are shown separately for the purpose of depicting how tasks may be delegated out over various resource and communications portions of the overall system 100.

If all the different parts are operating as desired, the cloud-based resources (130) will timely and properly perform their delegated tasks, timely return results to the task delegators (e.g., in 120) and the latter will then timely return appropriate results to the client hardware and software of mobile device 110 whereby the user is able to browse the new books, buy desired ones and be charged appropriately for them. By timely, it is often meant (depending on the task at hand) that the user experiences a request-to-results latency time of no more than a second or two. However, delegated flows of data processing, storing and/or communication tasks may go awry due to congestions, interferences, intermittent and creeping-wise growing anomalies anywhere within the complex system 110. Also at various times, "updates" are installed into various ones of reconfigurable resources of the system 100 and such updates may introduce unexpected and sometimes late-blooming problems into the system.

In order to deal in an orderly way with the massive size and complexity of the system 100, it is subdivided into management-defined "sections". The size and contents of each section is left to the mangers of the system, but generally each section; where 140 and 160 are two examples of such subdivisions, will include a limited number of intercoupled, "local" resources such as one or more local data processing units (e.g., CPU 141), one or more local data storage units (e.g., RAM 142, ROM 143, Disk 146), one or more local data communication units (e.g., COMM unit 147), and a local backbone (e.g., local bus 145) that operatively couples them together as well as optionally coupling them to yet further ones of local resources 148. The other local resources 148 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown) and so on.

It is to be understood that various ones of the merely exemplary and illustrated, "local" resource units (e.g., 141-148) may include or may be differentiated into more refined kinds. For example, the local CPU's (only one shown as 141) may include single core, multicore and integrated-with-GPU kinds. The local storage units (e.g., 142, 143, 146) may include high speed SRAM, DRAM kinds as well as configured for reprogrammable, nonvolatile solid state storage and/or magnetic and/or other phase change kinds. The local communication-implementing units (only one shown as 147) may operatively couple to various external data communicating links such as serial, parallel, optical, wired or wireless kinds typically operating in accordance with various ones of predetermined communication protocols. Similarly, the other local resources (only one shown as 147) may operatively couple to various external electromagnetic or other linkages 148a and typically operate in accordance with various ones of predetermined operating protocols.

The expected "normal" behaviors for the various local resources 141-148 of the given, local section 140 are defined by the system managers of local section 140. What is considered as "normal" behaviors in one local section (e.g., 140) may be substantially different from what is considered as "normal" behaviors in another local section (e.g., 160). For example, local section 140 is depicted as being inside Internet 120 (perhaps functioning as a web server inside 120) while local section 160 is depicted as being inside "cloud" 130 (perhaps functioning as a virtual machines implementing unit inside 130). It is to be understood that the descriptions for the various resources within local section 160 mirror those already provided for the various resources within local section 140 and that the reference numbers correspond (e.g., CPU 161 corresponds to CPU 141, RAM 162 corresponds to RAM 142, etc.).

In one embodiment, the expected and respective "normal" behaviors for the respective and various local resources, 141-148, 161-168, etc. of the given, local sections 140, 160, etc. are defined by the respective local system resource managers as knowledge base expert rules, stored and executed by respective local alarm generating subsystems 151 (of section 140), 171 (of section 160), and so on. An example of a local alarm generating rule might be: IF CPU clock speed<500 MHz THEN output Alarm_number_CPULT500 ELSE IF CPU clock speed>3.8 GHz THEN output Alarm_number_CPGT35. Another example might be: IF RAM Free Space<200 MB THEN output Alarm_number_RAMFLT200 ELSE IF RAM Free Space>100 GB THEN output Alarm_number_RAMFGT100. Each local alarm generating subsystem (e.g., 151, 171) is operatively coupled to its local section backbone (e.g., 145, 165) for acquiring in real time various performance indicating signals such as CPU utilization indicators, storage utilization indicators, communication resources utilization indicators, and other resource utilization indicators for the respective local resources (e.g., 141-148, 161-168). Typically, the internal operations (e.g., local alarm generating knowledge base rules) of the local alarm generating subsystems (e.g., 151, 171) are unknown to the rest of the system and thus appear as black box modules that receive inputs and then decide in black box manner whether to output alarms, and if so, what kind.

In one embodiment, each local section (e.g., 140, 160) includes a respective, real-time resources management unit (e.g., 152, 172) coupled to receive the generated alarms output by its respective local alarm generating subsystem (e.g., 151, 171). The real-time resources management unit (e.g., 152, 172) is configured to respond in accordance with local management defined appropriate ways to the locally generates alarms. The local management defined appropriate ways to respond might include doing nothing or simply counting how many times a certain kind of local alarm is output and/or the rate at which it is output. An example of a local alarm process rule might be: IF Alarm_number_

RAMFGT100 THEN Increment Excess Free Space Count by 1; IF Excess Free Space Count>100 THEN Output Alarm_number_RAMFCGT101 and Reset Excess Free Space Count; IF Alarm_number_RAMFGT100 AND Time of last Alarm_number_RAM-FGT100<200 ms THEN Output Alarm_number_RAMFCRLT200 ELSE Return.

Other responses of the respective, real-time resources management units (e.g., 152, 172) might be to implement short term fixes (154, 157) such as, IF Alarm_number_RAMFCRLT200=True_for_2RAMs Then Move Data in First Underutilized RAM to Second Underutilized RAM AND ReMap RAM Address Space AND Place First Underutilized RAM into Low_Power_Standby_ Mode. In other words, in this last example, the short term or quick fix (154) is to detect two underutilized resources of a same kind (it could have been DISK or COMM instead of RAM) and move utilization load into one of them so that the full utilization span of the other is made available and so that, for some cases, power consumption is reduced. However, this kind of short term fix does not address the underlying cause. Why did the alarmed situation arise in the first place and are there any long term modifications to be made to the system 100 so as to proactively avoid the alarmed situation to begin with? Again, it is to be noted that typically, the internal operations (e.g., local alarm generating knowledge base rules) of the local alarm generating subsystems (e.g., 151, 171) are unknown to the rest of the system and thus appear as black box modules. Moreover, it is to be understood that the internal operation settings of the local alarm generating subsystems (e.g., 151, 171) are not static and can change from time to time. The respective structure of each system section (e.g., 140, 160) is also not static and can change from time to time. For example, system managers may occasionally decide to increase or decrease the amount of volatile memory (e.g., 142/146; 162/166) present in specific ones of the system sections.

While the local real-time resource management units (e.g., 152, 172) provide short term fixes (154, 157) in response to some of the local alarms, generally, the detection and resolution of long term problems is left to a non-real-time, post-process analytics subsystem (e.g., 157, 177) of the respective local section (e.g., 140, 160). In other words, the real-time resources management units (e.g., 152, 172) are dedicated to quickly detecting problems of the short term kind and patching them up with whatever short term fix (e.g., 154, 174) seems most expeditious so that the section remains operational and so that the respective real-time resources management unit (e.g., 152, 172) can move on to detecting and resolving the next alarmed, real time situation. In contrast, the post-process analytics subsystem (e.g., 157, 177) is given time to go over historical records (e.g., 156, 176) and to apply time-consuming analytics to them so as to spot long term trends and come up with long term solutions (e.g., 158, 178) to spotted ones of the long term problems. To this end, an events logging subsystem (e.g., 155, 175) is provided in each local section (e.g., 140, 160) and operatively coupled to the local resources of that section for recording into a respective, local section performance log (e.g., 156, 176) section performance values for each local section event. The section performance values may include various resource utilization indicators for the respective local resources (e.g., 141-148, 161-168) such as CPU utilization indicators, storage utilization indicators, communication resources utilization indicators, and other appropriate utilization indicators deemed appropriate for substantively reporting the state of the respective local section at the time of the logged event.

Events that trigger performance logging thereof into the respective, local section performance log (e.g., 156, 176) may vary from section to section. A common type of event is a periodic status recording event where the local section state is periodically recorded into the local section performance log (e.g., 156, 176) say every 100 milliseconds (ms). Another type of event that may be often logged is successful completion of a task assigned to the local section. Yet another type of event often logged may be an unsuccessful ending of a task assigned to the local section, for example when the task is terminated due to an error. Task terminations due to error do not necessarily mean that a corresponding alarm will be output by the local section alarming subsystem (e.g., 151, 171). The signal inputs (151a, 171a) to the alarming subsystem (e.g., 151, 171) are not necessarily all the same as those (155a, 175a) of the events logging subsystem (e.g., 155, 175) of the respective section. The timings of the respective result outputs (e.g., of alarms, of event log records) of the local section alarming subsystem (e.g., 151, 171) and of the events logging subsystem (e.g., 155, 175) are also not necessarily the same. Each has its own assigned job (alarm generation and event logging) and generally performs it independently of the other.

As indicated above, typically the post-process analytics subsystem (e.g., 157, 177) of each respective section does not have access to the internal logic (e.g., expert knowledge base logic) of the corresponding section alarming subsystem (e.g., 151, 171) and vice versa. That means the post-process analytics is generally performed without benefit of the knowledge base logic embedded in the corresponding section alarming subsystem.

Figure 2:
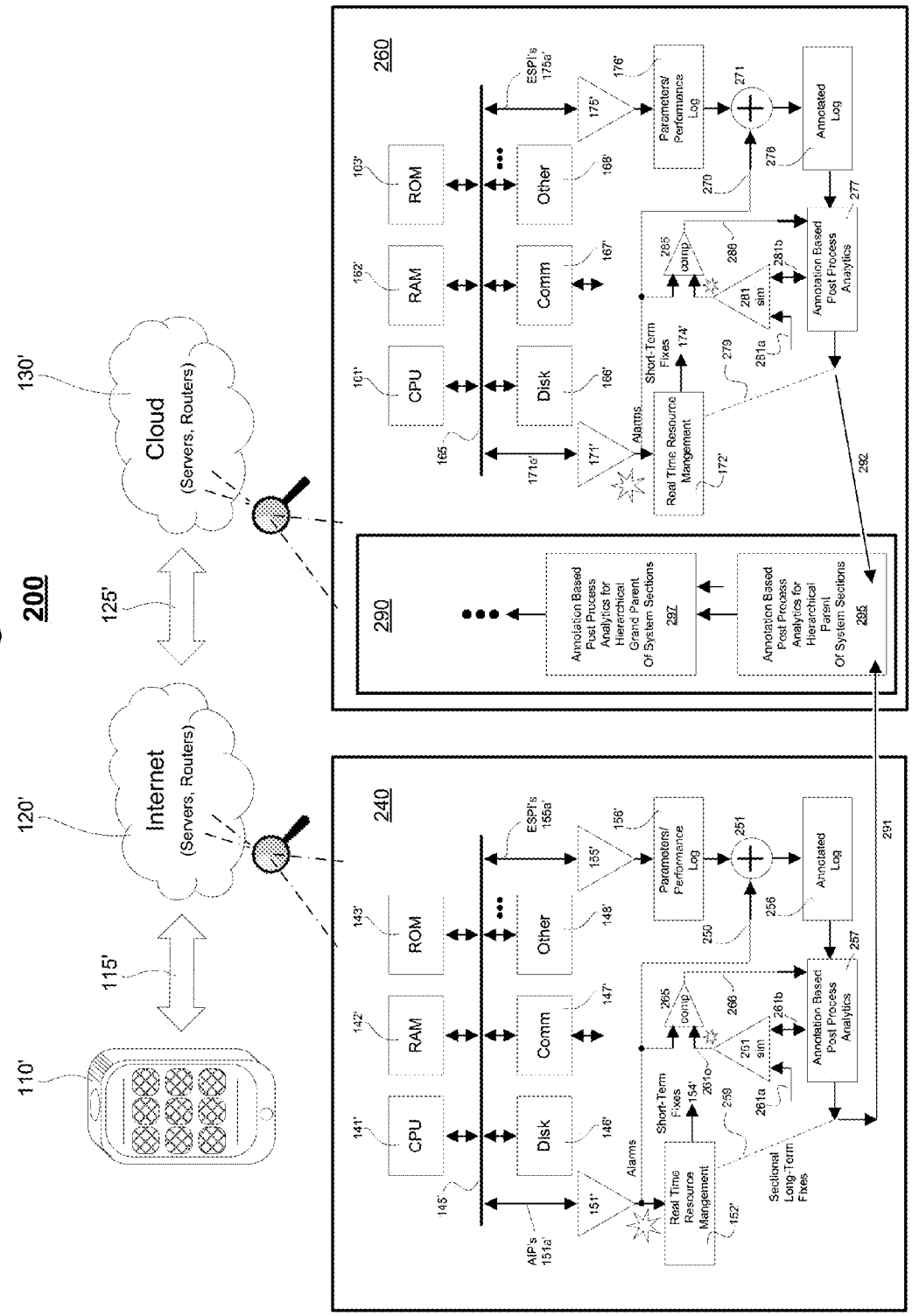
FIG. 2 is a block diagram schematically showing an interconnected multi-device system having embedded alarming and logging subsystems where post-process analytics blocks adaptively develop respective anomalies classification systems based on continuously updated and annotated behavior logs.

Referring to FIG. 2, shown is a system 200 in accordance with the present disclosure where the post-process analytics subsystem (e.g., 257, 277) of each respective section (e.g., 240, 260) is given a way of gaining access (at least in an indirect way) to the knowledge base logic embedded in the corresponding section alarming subsystem (e.g., 151', 171'). For sake of brevity, many of the reference numbers used in FIG. 1 are repeated as primed ones in FIG. 2 or changed from the 100 century series to the 200 century series. For example, the mobile client device 110 of FIG. 1 becomes mobile client device 110' of FIG. 2. CPU 141 of FIG. 1 becomes CPU 141' of FIG. 2 and so on. Thus, these do not need to be described again.

The internal structures of the local sections of FIG. 2 are changed and thus what was referred to in FIG. 1 as local section 140 becomes section 240 in FIG. 2. Similarly section 160 becomes section 260 in FIG. 2. A major change in each of the sections (e.g., 240, 260) is that the respective post-process analytics block (257, 277) is using a so-called, "annotated log" (e.g., 256, 276) for performing its respective local section analytics in place of using merely the "raw" event time versus performance log (156', 176') output by the respective events logging subsystem (e.g., 155', 175'). By annotating the "raw" event time versus performance log (e.g., 156', 176'), the system 200 gains access (at least in an indirect way) to the knowledge base logic embedded in the corresponding section alarming subsystem (e.g., 151', 171') and thus cam perform post-process analytics (e.g., 257, 277) on a more knowledgeable, and thus improved basis.

In one embodiment, the local "annotated log" (for example log 256 of system section 240) is generated by concatenating to each recorded one of the events in raw performance log 156' either an indication that no alarms 250 were output in a corresponding time slot by the section alarm generator 151' (e.g., by indicating Alarm(s)_current=: FALSE inside the annotated log) or concatenating to that raw event record an indication that one or more alarms 250 were output (e.g., by indicating Alarm(s)_current=: TRUE) and optionally identifying the number of such alarms and their types (e.g., by indicating Alarm(s)_current_of_Type1=: 1, Alarm(s)_current_of_Type2=: 3, Alarm(s)_current_of_Type3=: 0, etc.).

Figure 5:
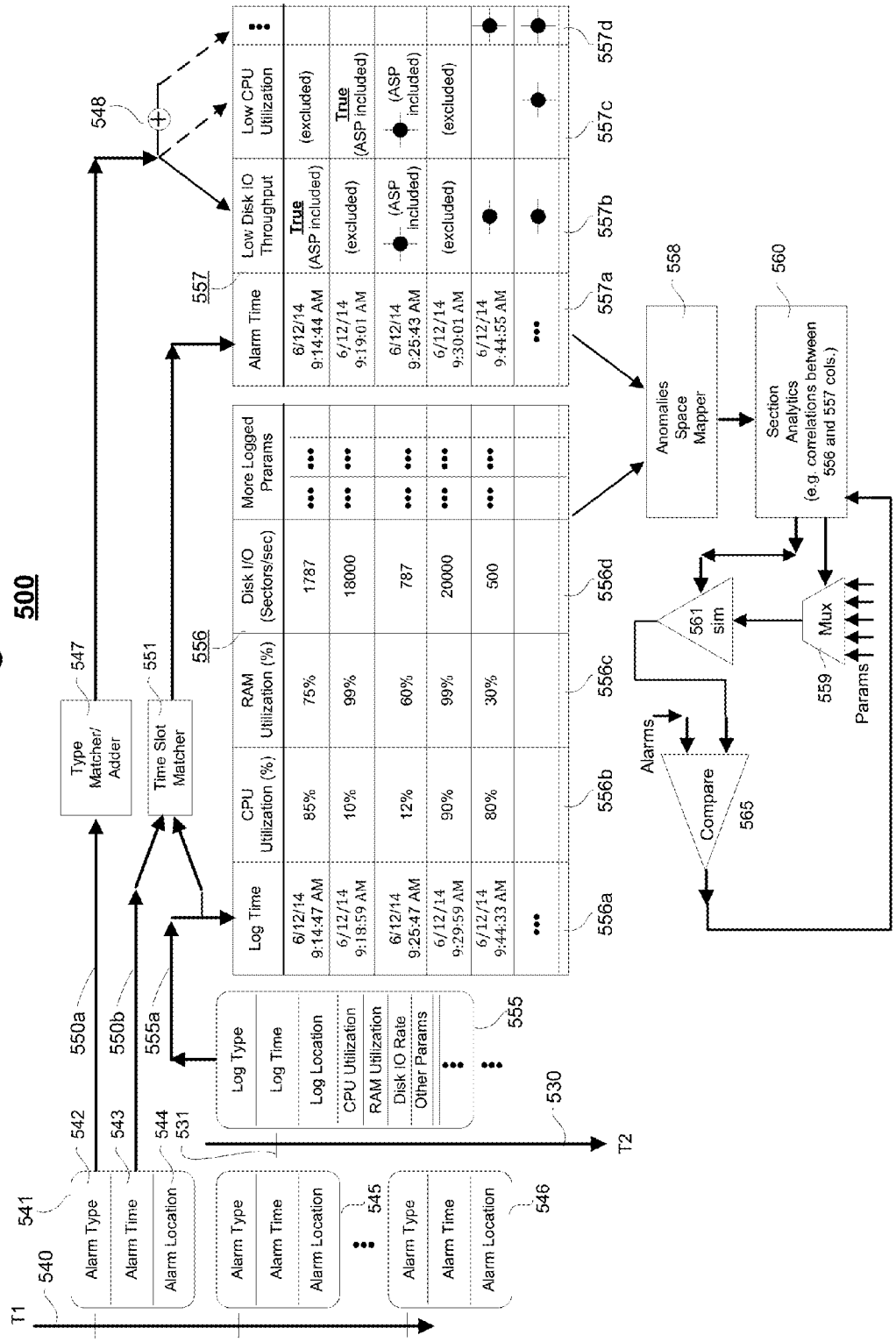
FIG. 5 is a schematic diagram depicting an over-time build up and updating of annotated logs for use in anomaly space mapping, histogramic behavior mapping and emerging behavior analysis.

Referring briefly to FIG. 5, shown is an example of a two-part annotated log 556/557 where portion 556 alone constitutes a raw events log while the co-aligned portion 557 constitutes a concatenated-on alarms-indicating section. In this particular example (which will be further detailed below) a time slot matching module 551 organizes the records of portions 556 and 557 so that the logged event time 556a of each raw event log record is substantially within a same time slot as the alarm time 557a of a corresponding one or more of the alarms (if any). Columns 557b, 557c, 557d, etc. are filled with respective indications of whether occurrence of specific types of alarms are True or False and optionally filled with details about the alarm types (e.g., how many? where located within the section? etc.).

Referring back to FIG. 2, records of the annotated log 256 are provided to an annotation-based post-process analytics module 257. It will become apparent that new records (more current records) are constantly being added to the annotated log 256 as newer events are recorded by the events logging subsystem 155' and as newer alarms 250 are output by the section alarm generator 151'. The post-process analytics module 257 automatically and repeatedly accesses the newer records of the annotated log 256 as new sample points and automatically, repeatedly updates various analytics models (not all shown) that it generates to represent its current understanding of the status and trajectory of its watched system section 240.

One of the analytics models that the post-process analytics module 257 creates and automatically, repeatedly updates is a simulated version 261 of the section's alarm generator 151'. As mentioned above, typically the inner workings of the section's alarm generator 151' are unknown to, and thus present as a black box to the post-process analytics module 257. However, with aid of the annotated log 256, the post-process analytics module 257 can start developing its own mapping of a parameters space so as to identify regions in parameter space that typically result in alarm generation and those that typically do not. Then, using this over-time, painted-in mapping of parameter space (e.g., filling in with sample points, the post-process analytics module 257 can extrapolate towards identifying in a broader sense, which regions in parameter space typically result in alarm generation, which typically do not, and what types of alarms in each region and at what frequency of occurrence. This extrapolated mapping becomes the foundation of the simulated version 261 of the section's alarm generator 151'.

Referring to FIG. 4A, shown is a simplified Venn-diagram like mapping of a two dimensional (2D) parameter space 400. In practice, parameter space 400 is many-dimensional (e.g., 3D, 4D, etc.) and may include time and location axes. For sake of simplicity, a 2D version is illustrated. Vertical axis line 410 represents a first operational parameter, such as for example; relative CPU utilization as measured on a normalized scale extending from 0% to a maximum value of 100%. In an alternate embodiment, the Param-1 axis 410 may represent CPU utilization in absolute terms such as for example, extending from 0 executed instructions per second (EI/S) to 3 Giga-EI/S and mapped logarithmically. (This is merely a nonlimiting example.) Similarly, the horizontal axis 420 represents a different second operational parameter of system section 240, such as for example; relative volatile memory utilization on a normalized scale extending from 0% to a maximum value of 100% of capacity. In an alternate embodiment, the Param-2 axis 420 may represent RAM utilization in absolute terms such as for example, extending from 0 non-free GigaBytes to 8 non-free GigaBytes and mapped logarithmically. (This is merely a nonlimiting example.)

Circular region 401 represents a bounded area (synthesized area) within the 2D parameter space 400 of system section 240 in which Type "1" alarms are expected to issue based on extrapolation from a set of "included" sample points (ASP's) and "excluded" sample points (NASP's). When it starts to access the records of the annotated log 256, the post-process analytics module 257 does not yet know that region 401 will turn out to be a single circular bounded area with no voids in it. The Type "1" alarms including region 401 could instead turn out to be several spaced apart, bounded shapes with or without voids inside one or more of them. (The shape of circular unified, Type "1" alarms including region 401 is used here for simplicity sake. In general, alarms including regions can have various shapes including disjointed ones and void containing ones.) However, as the post-process analytics module 257 starts plotting-in (e.g., marking-in as sample point dots) Alarmed Sample Points (ASP's) that include a Type "1" alarm, the analytics module 257 will slowly start learning, based on the painted-in, "included" sample points (e.g., $ASP_{01a}$, $ASP_{01b}$, $ASP_{12a}$, $ASP_{12b}$, $ASP_{01d}$, $ASP_{01e}$, . . . —moving clockwise around the interior of the circular boundary of Type "1" alarmed region 401) that said boundary is a circular one. In addition to the Alarmed Sample Points (ASP's) that include the Type "1" alarm, there may be Non-Alarmed Sample Points (NASP's) in the first parameter space 400 for which no alarms are typically issued. In the illustrated example, the Non-Alarmed Sample Points include $NASP_{00a}$, $NASP_{00b}$, $NASP_{00c}$, $NASP_{OOd}$, $NASP_{OOe}$, . . . —moving clockwise around the exterior of the circular boundary of Type "1" alarmed region 401 where the latter Non-Alarmed Sample Points (NASP's) indicate regions of the first parameter space 400 from which the Type "1" alarms are excluded. By automatically and repeatedly filling in ASP's and NASP's into the first parameter space 400 on the basis of newer records found in the automatically, repeatedly updated, annotated log 256 of system section 240, the corresponding analytics module 257 can adaptively learn the contours of the Type "1" alarms-including region 401.

Similarly, the contours of the Type "2" alarms-including region 402 can be discerned over time as inner boundary hugging, Alarmed Sample Points (ASP's) thereof appear. More specifically, as $ASP_{02a}$, $ASP_{02b}$, $ASP_{02c}$, $ASP_{123b}$, $ASP_{123a}$, . . . and so on appear—moving clockwise around the interior of the circular boundary of Type "2" alarmed region 402, the outer contours of that region begin to emerge. Also Non-Alarmed Sample Points such as $NASP_{00b}$, $NASP_{00f}$, $NASP_{00c}$, . . . and so on begin to show parts of parameters space 400 from which the Type "2" alarms-including region 402 is excluded. In FIG. 4A, a notation of the form, $ASP_{n1, n2, \ldots, nm}$ indicates that the corresponding sample point is one at which alarms of Types n1, n2, . . . , nm appeared. A zero in the ASP or NASP subscript number is merely a place holder meaning no correspondingly numbered alarm issued. More specifically, $ASP_{123a}$ and $ASP_{123b}$ respectively indicate sample points of space 400 where all of Type "1", Type "2" and Type "3" appeared. By the same token, $ASP_{13a}$ and $ASP_{13b}$ respectively indicate sample points of space 400 where each of Type "1" and Type "2" alarms appeared, but not Type "3".

Given this, it may be appreciated how sample points $ASP_{13b}$ and $ASP_{01f}$ help to delineate the exterior and interior of the boundary for a third or Type "3" alarms-including region 403. In this example, Type "2" alarms may appear inside region 403. For example, all of $ASP_{13a}$, $ASP_{13b}$, $ASP_{123a}$, $ASP_{123b}$ indicate that a Type "2" alarm appeared at that respective sample point within the first parameters space 400.

The parameter axes (e.g., 410, 420) of the first parameters space 400 are not dictated by the alarm-input parameters (AIP's 151a') used by the section's alarm generator 151' for generating its alarms. Although FIG. 2 schematically shows each of alarm generator 151' and events logger 155' receiving its respective inputs (AIP's 151a' and ESPI's 155a') from a common section bus 145' (or other form of interconnect fabric 145') that does not mean the Event Sampled Parameter Inputs (e.g., ESPI's 155a') are the same as the alarm-input parameters (AIP's 151a'). There could be overlap. However, it is not necessary.

Examples of Event Sampled Parameter Inputs (e.g., ESPI's 155a') recorded by the events logger 155' into the raw events log 156' may include, but are not limited to: time or time slot of the event; day of the week (e.g., Monday, Tuesday, etc.); month of the year (e.g., January, February, etc.); portion of the local section where the recorded event is centered (e.g., CPU, RAM, . . . , Comm, Other) and so on. Additional input parameters (ESPI's 155a') used by the events logging subsystem 155' to update the raw (non-annotated) log 156' may include: (a) current CPU utilization rate (preferably in absolute terms; e.g., instructions per second rather than relative terms; e.g., percentage of maximum instructions per second); (b) current volatile memory utilization rate (preferably in absolute terms; e.g., bytes per second written and/or read); (c) current volatile memory filled, free and unusable space amounts (preferably in absolute terms; e.g., bytes free, bytes filled, bytes unusable rather than relative terms; e.g., percentage of maximum capacity filled, free and marked as unusable); (d) current local backbone (145') data transfer rates and error rates (preferably in absolute terms; e.g., bytes per second transferred and number of packets per second with correctable (ECC) errors and with noncorrectable errors); (e) current nonvolatile memory (e.g., Flash, disk) utilization rates (preferably in absolute terms); (f) current nonvolatile memory filled, free and unusable memory space amounts (preferably in absolute terms); (g) current external communication (147a') data transfer rates and error rates (preferably in absolute terms) and so on. Axes of the automatically and repeatedly built and refined multi-dimensional map 400 (FIG. 4A) may further include a time of day one (e.g., in 15 minute accumulative blocks), a time of week one (e.g., Monday, Tuesday, etc.), time of month (e.g., first week, second week etc.) and time of year one (e.g., day 107 of 365), holiday or nonholiday; indoor and outdoor weather conditions (e.g., storms, hot, cold, etc.). Axes of the automatically and repeatedly built and refined multi-dimensional map may further include local location ones such as indicating which of wiring interconnects were involved in the event. One of the goals of the parameter spaces mapping functions of the post-process analytics module 257 may be to automatically determine which of the ESPI's 155a' correlate as result-influencing and non-redundant parameters for observed alarms 250 and which do not.

Another goal of the post-process analytics module 257 may be to automatically form the mimicking version 261 of the local alarms generator 151' where part of the forming step is determining which of the ESPI's 155a' to use as drive inputs 261a for the mimicking alarms generator 261 (also referred as simulated ("sim") alarms generator 261) and which not to bother using (e.g., because they are redundant or not one of the result-influencing parameters). The utilized ESPI's are fed in as inputs 261a into the reconfigurable, sim alarms generator 261. The utilized internal logic of the reconfigurable, sim alarms generator 261 can include knowledge base rules similar to those used in (but hidden inside of) the local alarms generator 151', an exception being that the internal logic of the sim alarms generator 261 is responsive to its chosen parameters 261a. The post-process analytics module 257 accesses the non-hidden internal logic of the sim alarms generator 261 by way of coupling 261b for changing that logic and/or analyzing it. A comparator 265 compares the alarms 250 output by the local alarms generator 151' against the alarms 2610 output by the sim alarms generator 261. The comparison results 266 inform the analytics module 257 of differences between the behaviors of the local alarms generator 151' and the sim alarms generator 261. For example, if the visible internal logic of the sim alarms generator 261 (accessible via coupling 261b) does output an alarm (261o) while the hidden internal logic of the local alarms generator 151' does not, that may indicate that there is an exception (e.g., a void in a Venn region of FIG. 4A) that the model inside the sim alarms generator 261 does not yet know about. The analytics module 257 uses the comparison results 266 to either update the sim alarms generator 261 or otherwise investigate why there is a difference in results. (It could be, for example, that the local alarms generator 151' is in error and the sim alarms generator 261 is not.)

Over the course of time, as the post-process analytics module 257 automatically develops a better understanding of when and for what reasons alarms (e.g., 250, 261o) are generated for operations within its local system section 240, it may generate long term fixes 259 for how its local system section 240 operates. For example, one long term fix 259 may reconfigure how the local real-time resources management unit 152' operates in response to alarms 250. Such a long term fix 259 may cause the real-time resources management unit 152' to be more reactive or less reactive to certain kinds of alarms. Another long term fix 259 may reconfigure one or more of the local resources 141'-148' of the local system section 240. For example, local operations controlling software in the local nonvolatile memory (e.g., 143', 146') might be reconfigured for proactively overcoming emerging anomaly tends.

Referring back to FIG. 4A, assume for example that region 404 of the first parameter space had until very recently been free of alarms. Then suddenly new alarms such as $ASP_{04a}$ begin appearing in region 404. That may inform the local analytics module 257 that a new trend is emerging. Something has changed with respect to how its local system section 240 is being used. This emerged change in behavior is not routine and thus may be a situation of significant concern. Accordingly, through use of the annotated log 256 and historical mapping of routine ASP's in regions 401, 402, 403 (as an example), the local analytics module 257 can be alerted to emerging anomalies (e.g., ASP04a of region 404) that may be of significance.

Referring back to FIG. 2, post-process analytics results (e.g., 291, 292) from separate system sections (e.g., 240, 260) may be merged together in a hierarchically organized manner (295, 297, etc.) to thereby develop a broader picture of emerging trends within the overall system 200. For example, and referring also to FIG. 4A, it could be that within the same time frame when new alarms (e.g., $ASP_{04a}$)

begin emerging in previously quiet region 404 of the first parameter space 400 of section 240, similar new alarms (e.g., $ASP_{09a}$) begin emerging in a previously quiet region 409 of a second parameter space 440 associated with system section 260. The parent analytics module 295 which merges the analytics results (219, 292) of sections 240 and 260 may be programmed to detect the substantially cotemporaneous emergence 470 of new alarms in previously quiet parameter space regions 404 and 409. This may inform the parent analytics module 295 that something more wide-spread is developing within the system 200 as a whole and the emerging trend is not confined merely to system section 240.

In FIG. 4A, the second parameter space 440 is understood to be that associated with the second system section 260 and to be a multi-dimensional mapping of its chosen parameters, for example parameter Param-1' as enumerated along vertical axis 450 and parameter Param-2' as represented along horizontal axis 460. At least some of the parameters (e.g., 450, 460) of the second parameter space 440 may be essentially the same as those (e.g., 410, 420) of the first parameter space 400 such that various mathematical operations may be carried out with them. For example, the sample point results of the two may be added together to produce a combined mapping of the alarmed and non-alarmed parameter space regions of the two system sections (240, 260) when considered in unison. As another example, portions of the two parameter spaces (400, 440) in which same type alarms overlap (e.g., 402 and 408) may be identified and/or portions of the two parameter spaces where there is a lack of any overlap or cross correlation may be identified. The identifications of such areas of substantial sameness and of stark differences may allow the parent analytics module 295 to gain insight into the current states of the system sections (e.g., 240 and 260) which it is charged with analyzing. In one embodiment, a determination is automatically made as to which internal logic portions of the respective sim generators, 261 and 281 are responsible for producing the alarms that are in the areas of substantial sameness for the two parameter spaces 400 and 440 and which are responsible for producing the alarms that are in the areas of substantial difference. A parent sim generator (not shown) may be synthesized for use within the hierarchical parent analytics module 295 for use in gaining post-process analytics insight for the system sections (e.g., 240 and 260) covered by the parent. Similar hierarchically organized structures and operations may be provided within the grand-parent analytics module 297 where the latter combines the results of two or more parent analytics modules (only one shown: 295). By so hierarchically combining the post-process analytics results of various sections (e.g., 240, 260) of the overall system 200, a grander machine-implemented understanding of the operational states of the system 200 may be obtained, including for example; identifying where in the system, cotemporaneous and multi-sectional anomalous behaviors emerge such as those 470 of regions 404 and 409 of FIG. 4A.

Referring to FIG. 4B, in one embodiment the respective sectional analytics modules (e.g., 257, 277) keep track of historical trends within their resource system sections (e.g., 240, 260), for example by way of maintaining histograms (e.g., 401a, 401b, 402a, 402c, 478a, 409d) of the alarms generating behaviors of their actual and/or simm'ed alarm generators relative to predefined subsections of the mapped, alarmed and non-alarmed parts of the respective parameter spaces (e.g., 400' and 440'). More specifically, symbol 401a represents an alarms-add rate histogram for the white elliptical subregion below it among the subregions of Type "1" alarms region 401. The illustrated histogram 401a maintains rolling window statistics for its subregion as well as keeping track of more recent alarm additions within that subregion during a predefined and also rolling, short term temporal window. Thus as indicated on the alarms-add rate histogram 401a, there may be a normal (e.g., statistical mean, median, etc.) "low" rate of alarm additions versus time, a normal "high" rate and a more recent current rate, which in the case of histogram 401a is between the normal low and normal high rates. Thus the respective sectional analytics modules (e.g., 257) may automatically determine that there is no unusual, emerging trend currently developing in the subregion covered by histogram 401a. By contrast, exemplary histogram 402c is showing a currently, above normal high, additions rate (rate at which alarms are generated for that portion of parameter space) for its respective subregion of Type "2" alarms region 402. As a result, the respective sectional analytics modules (e.g., 257) may automatically determine that unusual behavior is currently emerging in the subregion covered by histogram 402c. The specific reaction to the noted unusual behavior may vary based on application and may include waiting to see how long the unusual behavior (e.g., above normal high alarms rate) continues. Just as an above normal high alarms rate may be cause for concern, a below normal low alarms rate may be cause for concern. It may indicate that the corresponding subregion is being inefficiently underutilized. It may indicate that some of the resources associated with the underutilized subregion can be re-allocated to subregions (e.g., that of histogram 402c) exhibiting above normal high alarm rates.

Figure 3:
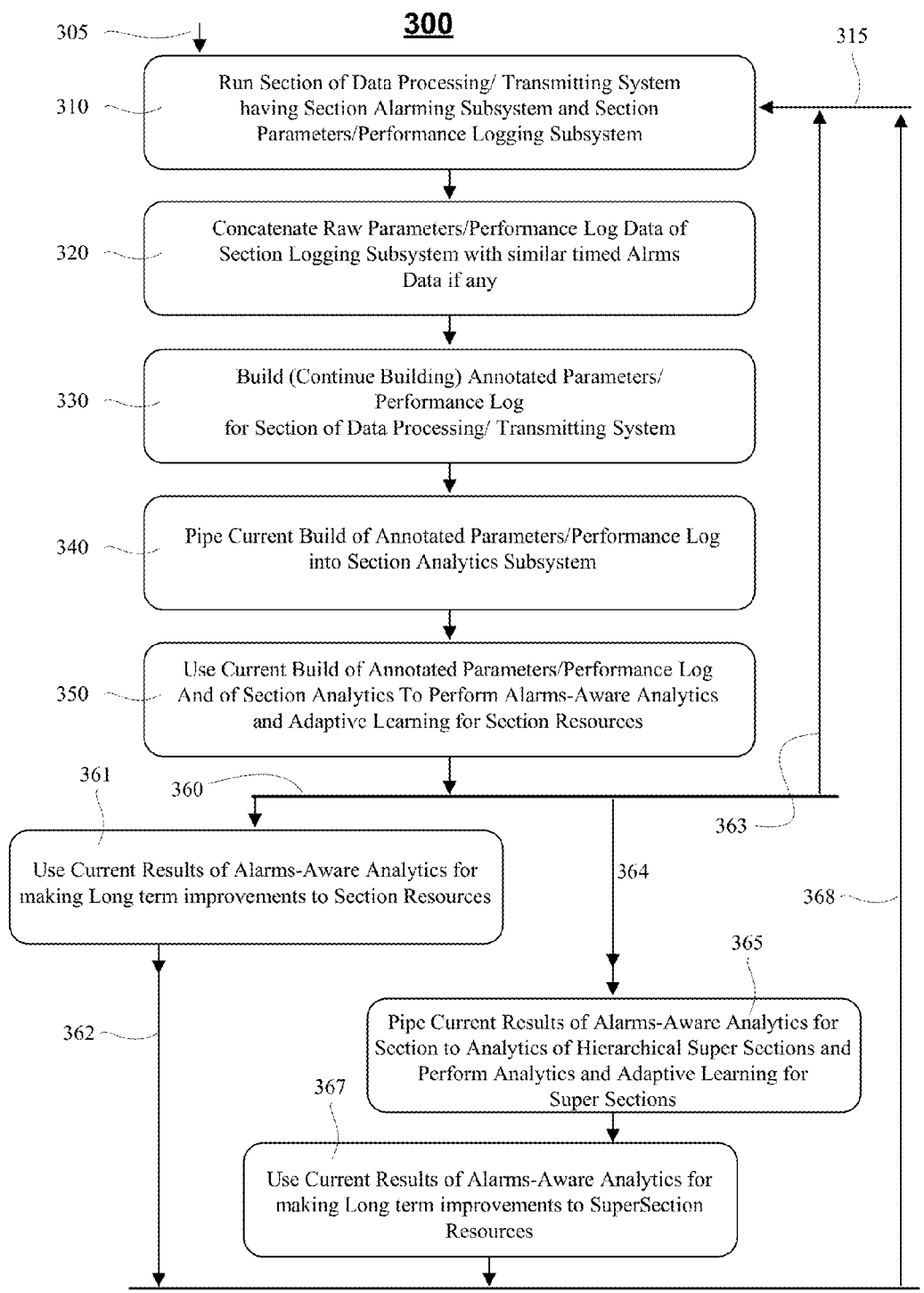
FIG. 3 is a flow chart depicting an automated process for building respective and continuously updated, annotated behavior logs for respective sections of the interconnected multi-device system of FIG. 2.

Referring to FIG. 3, a machine-implemented method 300 for generating and using annotated logs is described.

Entry may be made at 305 into process step 310. In step 310, a corresponding section (e.g., 240, 260) of the overall system (e.g., 200) is allowed to run within a live, real time environment or a test simulation environment. The running section may be a data processing and/or data transmitting section and it may include one or more of the various section resources such as 141'-148' illustrated for the case of FIG. 2. Additionally, the running section includes a local alarms generator such as 151', a local events logging subsystem (e.g., 155'), a raw events log (e.g., 156'), a data concatenater (e.g., 251), a memory space for maintaining an annotated log (e.g., 256) and a post-process analytics module (e.g., 257) that is operatively coupled to the raw events log and to the memory space of the annotated log for purpose of carrying out post-process analytics based on the data stored in at least one of the raw events log (e.g., 156') and the annotated log (e.g., 256).

At subsequent process step 320, the time line is subdivided into predetermined slots (e.g., one or more for each periodic event logging record) and data regarding alarms generated during each time slot is concatenated to (or otherwise logically linked to) data of a corresponding event logging record.

Reference is now made to FIG. 5 which depicts an exemplary data flow 500 that include the formation of an annotated log 556/557. Line 540 represents a first time line (T1) along which respective alarm reports (e.g., 541, 545, 546, etc.) are output by a local alarms generator (e.g., 151' of FIG. 2). Line 530 represents a second time line (T2) along which respective event log reports (e.g., 555) are output by a local events logging subsystem (e.g., 155' of FIG. 2). The log time 531 of each respective event report (e.g., 555, only one shown) is generally not coincident with the T1 timings of associated alarm reports (e.g., 541, 545, 546, etc.). In one embodiment, an alarms-inclusion window (not shown) is defined about the event log time 531. The temporal length and phasing of the alarms-inclusion window (not shown) relative to the event log time 531 may vary. For example, the start and end points of the alarms-inclusion window may be equidistant from the event log time 531; or one of these points may be coincident with event log time 531; or displaced in another appropriate manner relative to the event log time 531. Alarm reports (e.g., one or more of 541, 545, 546, etc.) whose alarm times fall within the alarms-inclusion window (not shown) of an event report (e.g., 555) are deemed to be logically associated with that event report.

In one embodiment, the temporal length and phasing of the alarms-inclusion window (not shown) relative to the event log time 531 is made a function of system section and context, where for example temporal length is relatively long for a first section under a corresponding first contextual situation and temporal length is substantially smaller for a second section and under a corresponding second contextual situation. More specifically, there may be different drifts of clocks as between alarm generation and event logging in different section s and on different systems. There can be differences in cadence of logging in different logs of respective different system sections. The differences may be functions of system bandwidth and user utilization, of quality of signal transmission in different parts of the network, and so forth. In one embodiment, an expert knowledge database of rules is automatically consulted and used for setting temporal length and phasing of the alarms-inclusion window in each system section. An exemplary knowledge database might read: IF Usage_of_section_resources<Threshold_1 AND Day_of_Week=Weekend THEN alarms-inclusion_window.length=L1 AND alarms-inclusion_window.phase=50%/50% ELSE IF Usage_of_section_resources>Threshold_1 AND Usage_of_section_resources<Threshold_2 AND Day_of_Week=Wednesday THEN alarms-inclusion_window.length=L2 AND alarms-inclusion_window.phase=30%/70% ELSE IF Quality_of_Packets<Threshold_3 THEN . . . , where here L1 and L2 are respective predetermined constants indicative of window lengths and Threshold_1 as well as Threshold_2 are respective predetermined constants indicative of resource usage amounts while Threshold_3 is a constant indicative of QoS for data communication packets. The rules in the knowledge database might alternatively or additionally include rules that are dependent on recent measures of clock drift or synchronization as such between different parts of the system.

In the illustrated example of FIG. 5, alarm report 541 is determined to be a one and only alarm report that falls within the alarms-inclusion window (not shown) of event report 555. There could have been none of more than one. As seen, the alarm report 541 may include an alarm type field 542. The alarm type may be specified as a type number and/or more descriptively; for example as a "Low Disk I/O Throughput" alarm (see column 557b of the annotation portion 557). The alarm report 541 may include an alarm time field 543 that is indicative of a time point along T1 that is associated with the alarm report 541, for example when the alarm was output or when a system state associated with the alarm took place. The alarm report 541 may include an alarm location field 544 that is indicative of one or more locations within the system (e.g., 200 of FIG. 2) for which the alarm was issued. The indicated alarm location may simply identify the local system section (e.g., 240, 260) or it may provide more detailed information about the location involved with the alarmed situation (e.g., disk drive A544 of disk bank B543).

In accordance with one machine-implemented method of the present disclosure, for each detected event report (e.g., 555), its alarms-inclusion window (not shown, corresponds to time 531) is determined and alarm reports (e.g., 541) which fall within that alarms-inclusion window are identified by a time slot matching unit 551. More specifically, the time slot matching unit 551 fetches (555a) the log time of the given event report 555, determines the associated alarms-inclusion window, tests for alarms along time line T1 (540) that are within that alarms-inclusion window, fetches the alarm time (e.g., 543) of each such included alarm report and records the fetched alarm time in a column (e.g., 557a) of a being-formed, annotation portion 557. For sake of simplicity it is assumed that there is only one alarm and one alarm time (e.g., Jun. 12, 2014, 9:14:44 AM) associated with the topmost event record (e.g., Jun. 12, 2014, 9:14:47 AM) of the logged events portion 556. As indicated elsewhere, there could be many alarms and they could be of same or different types. In the case of the exemplary topmost event record, there is one "Low Disk I/O Throughput" alarm and thus the matrix cell for that row and for column 557b (Alarms of the Type: Low Disk I/O Throughput) is marked "True" (or alternatively as Alarm Sample Point, ASP included here). Since there are no other alarms for this example, the remaining cells in the row are marked "False" (or alternatively as "excluded" or as No-Alarm Sample Point, NASP included here). In corresponding FIG. 4A, an ASP dot is added for example to the Type "1" region 401 if that is the region of the Low Disk I/O Throughput alarms. The location of the added ASP dot in the multi-dimensional parameter space 400 is a multi-dimensional one. As more and more such ASP dots are added, one or more multi-dimensional, bounded shapes (e.g., spheroid 401) may become apparent as being associated with such Type "1" alarms.

For each detected alarm (e.g., 541) within the alarms-inclusion window of a respective event record, an alarm type matching/adding unit 547 automatically fetches (550a) the alarm type 542 and searches among the alarm-type columns (e.g., 557b, 557c, 557d, etc.) of the forming annotation portion 557 for a matching one. If a match is found, a corresponding True (or ASP here) indication is recorded in the respective matrix cell. If a match is not found, a new column adder function 548 is activated, a corresponding new column (e.g., 557e—not shown) is added to the forming annotation portion 557 and a corresponding True (or ASP here) indication is recorded in the respective matrix cell of the newly added column. Thus the annotation portion 557 grows in size and complexity as new alarm types are encountered. It is to be understood that at some point, when a predetermined threshold for allowed number of detailed rows is reached, the information of older rows is summarized and stored in a rolling window of older statistics while the older detailed rows are freed by garbage collection to make room for newer detailed rows.

Returning to step 330 of FIG. 3, as the respective system section (e.g., 240, 260) continues to execute within a real live environment or a simulated one, the corresponding annotated log (e.g., 256, 276) continues to build in terms of number of details and number of ASP's added to the corresponding parameter space (e.g., 400, 440 of FIG. 4A). Events that have no alarms become added NASP points.

Referring to step 340, after the annotated log (e.g., 256, 276) has been built up to a size of sufficient utility (where such size may vary from system section to other section), the local post-process analytics module (e.g., 257, 277) fetches the current build and in subsequent step 350 uses it to perform alarms-aware analysis of the current state of its system section and adaptive learning about how the local alarms generator (e.g., 151', 171' of FIG. 2) appears to be working while building or updating its accessible sim version (e.g., 261, 281) of an alarms generator and comparing 265, 285) outputs of the two so as to develop insight regarding where the outputs of the real-time alarms generator (e.g., 151', 171') and of the sim version (e.g., 261, 281) differ, and why, and what if anything should be done in response to detected differences (266, 286).

At juncture point 360, the process 300 has a number of options which are not mutually exclusive (more than one can be carried out in substantially the same time period). One of the options is to simply return (363) to step 310 by way of path 315 and continue to run the section, build the annotated log (step 330) and study it some more (step 350).

Another option 364 is to take part or all of the current analytics for the local system section and forward 365 the gathered analytics to a hierarchical parent analytics section (e.g., 295) which performs a hierarchically higher level of analytics on the results of two or more system sections. Step 367 represents a using by the hierarchical parent analytics section (e.g., 295) of the forwarded sectional analytics and a making of one or more adaptive changes at the super-sectional level. Yet another option represented by 361/362 is to use the currently developed set of local analytics for making long term changes (hopefully, performance improving changes) to resources of the local system section. One of those changes can include reconfiguring the sim alarms generator (e.g., 261, 281) to more accurately mimic the behavior of the real-time alarms generator. Another of those changes can include reconfiguring other resources of the local system section so as to reduce those of the parameters that appear to be the main drivers behind excessive numbers and/or frequencies of certain kinds of alarms. For example, in the case of column 557b of FIG. 5, a driving cause of the low disk I/O throughput might be because a certain thread of executing software is holding up other threads as the first thread waits for slow results. A solution might be to cache some of the disk data into system RAM so it may be more quickly accessible. Yet more specifically, the local post-process analytics module (e.g., 257) might scan down column 556c of the event log portion of the annotated log 556/557 and discover that low RAM utilization cross correlates with low disk I/O throughput in column 557b while high RAM utilization cross correlates with Non-Alarmed sample points (NASP's) down column 557b. The post-process analytics module (e.g., 257) might then deduce (using appropriate artificial intelligence techniques such as expert knowledge base techniques) that the problem might be solved by urging the system section dynamics into a mode that more often has high RAM utilization. This of course, is merely an example. In actual practice, the cross correlation patterns between alarms (portion 557) and parameters (portion 556) might be more complex than the given example.

Subsequent to steps 361 and/or 367, path 368 is taken back to step 305 by way of path 315. The system (e.g., 200) keeps exercising its various sections, building annotated logs for the respective sections, building hierarchical parent level, annotated logs for respective groups of sections, performing post-process analytics for the respective sections, super-sections and even hierarchically higher up grandparent and so-on sections, and making appropriate changes based on the various analytics results.

Referring briefly back to FIG. 5, one of the local changes is that of automatically determining which parameters of the local parameter space are useful for delineating between alarmed behaviors and which are not. Cross correlation analysis may be used for identifying parameters that correlate poorly relative to regions of different alarm types (e.g., 401, 402 of FIG. 4A). A parameters selection multiplexor 559 may be operated to weed out the poorly correlating parameters. Comparator 565 provides feedback to the post-process analytics unit 560 so that the later can also adjust the internal logic of the accessible sim generator 561.

Figure 6:
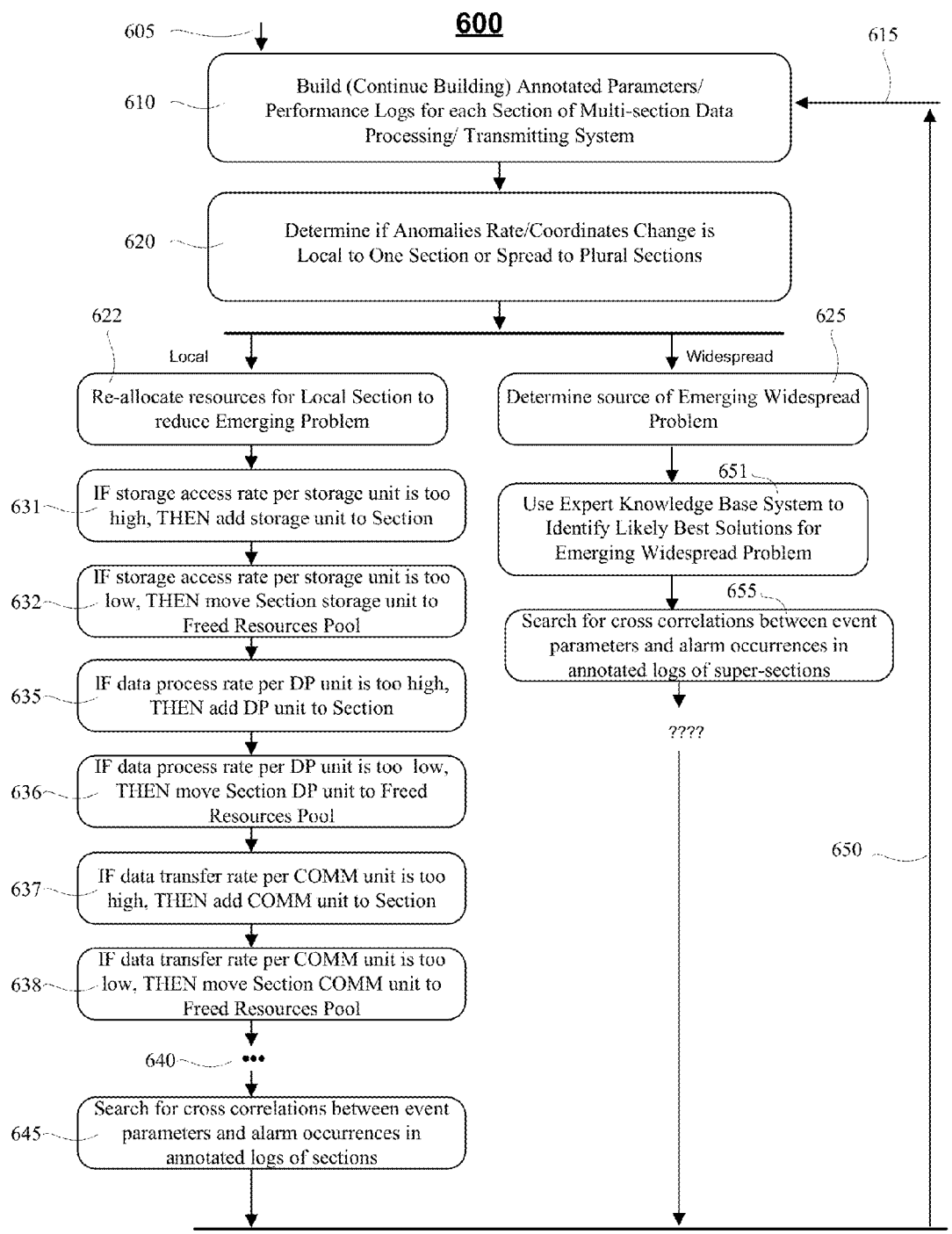
FIG. 6 is a flow chart depicting an automated process for using the results of the annotated logs to proactively resolve emerging problems of significance.

Referring to FIG. 6, shown is a machine-implemented method 600 for identifying localized and more widespread emerging problems within a multi-device, multi-sectional system such as 200 of FIG. 2. Entry is made at 605.

In step 610, the annotated logs of the respective system sections are individually built up as each section of the executing system performs its assigned tasks. In step 620, atypical changes of ASP additions to respective parameter spaces (e.g., 400, 440) are searched for and noted. The atypical changes of Alarmed Sample Point (ASP) additions may include one or both of additions to regions (e.g., 404, 409) of parameter space that previously did not have ASP's in them and abnormal changes to rate of ASP additions in various subsections (see again, FIG. 4B). Moreover, within step 620, a determination is made as to whether the noted atypical changes are localized to one system section or constrained to one type of system sections or are more widespread and cotemporaneous so as to indicate a system-wide problem.

If the noted atypical changes are localized, then step 622 illustrates a generalized step for ameliorating the emerging problem, namely, re-allocating resources (e.g., 141'-148') of the local section (e.g., 240) in a manner which typically reduces the noted and emerging problem. Step 631 depicts a more specific example: IF the storage access rate per storage unit in the section is too high relative to a predetermined threshold, THEN add one or more additional storage units (e.g., volatile or nonvolatile) to the affected section. Step 632 depicts another specific example: IF storage access rate per storage unit in the local section is too low relative to a predetermined threshold, THEN combine data of two or more units into one and move a freed section storage unit of the section to a freed resources pool of the system. Yet another possible solution is depicted in step 635: IF the data processing rate per DP unit is too high relative to a predetermined threshold, THEN add one or more additional DP units to the local section and re-assign some of the section tasks previously routed to the previously present DP units to the newly added DP units. A further option is shown in step 636: IF the data processing rate per DP unit is too low relative to a predetermined threshold, THEN move tasks of one DP unit to another of the same section and move the task-freed section DP unit to a freed resources pool of the system. Similarly, steps 637-638 depict too high and too low solutions for atypical data transfer rates involving the COMM resources of the local system section. Symbol 640 represents yet more of similar solutions for other resources of the affected section. Step 645 represents an automatically repeated search for cross correlations between event parameters and non-routine alarm occurrences in the annotated logs of the local sections. One example was given for columns 556c and 557b of the FIG. 4A where it turned out that low RAM utilization correlated with low disk throughput (merely as a hypothetical example). Path 650 loops the process back to step 610 for automatic repetition.

If the noted atypical changes are determined in step 620 to be more widespread, then step 625 illustrates a generalized step for ameliorating the emerging problem, namely, determine the source of the emerging widespread problem based on it being widespread. For example, a key communications fabric of the system may be experiencing problems that cannot be corrected with normal quick fix solutions. The system might be subject to a widespread denial of services attack. Step 651 depicts the use of an expert knowledge base system to identify the likely causes and likely best solutions for such emerging widespread problems based on their being widespread and simultaneously affecting some regions of parameter space but not others.

Step 655 represents an automatically repeated search for cross correlations between event parameters and non-routine alarm occurrences in the annotated logs of system supersections (e.g., 295, 297). One example might be that communication data transfer rates (COMM rates) are unusually low for certain kinds of system sections and the problem correlates to a time range where a newly installed communications control software package becomes activated. This being given merely as a hypothetical example. Path 650 loops the process back to step 610 for automatic repetition.

The present disclosure is to be taken as illustrative rather than as limiting the scope, nature, or spirit of the present teachings. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated and taught here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Further, the functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "component," "block", "database", "agent" or "system." Furthermore, aspects of the present disclosure may take the form of a computer program product embodied in one or more non-ephemeral computer readable media having computer readable and/or executable program code embodied thereon.

Any combination of one or more computer readable media may be utilized. The computer readable media may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an appropriate electrical connection having one or more wires, a portable computer diskette, a hard disk, a random access memory (RAM), a read-only memory (ROM), an erasable programmable read-only memory (EPROM or Flash memory), an appropriate optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct/program a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The foregoing detailed description has been presented for purposes of illustration and description. It is not intended to be exhaustive or limiting to the precise form disclosed. Many modifications and variations are possible in light of the above teaching. The described embodiments were chosen in order to best explain the principles of the disclosed technology and its practical application, to thereby enable others skilled in the art to best utilize the technology in various embodiments and with various modifications as are suited to the particular use contemplated. It is intended that the scope be defined by the claims appended hereto.

What is claimed is:

1. A machine-implemented method of separately dealing with emerging and possibly not routine anomalies of a data processing system that could be of significance to continuing operations of the data processing system, the data processing system being subdivided into a plurality of sections with each section comprising intercoupled local resources including one or more local data processing units and one or more local data storage units, wherein two or more of the plural sections each respectively includes a respective section behaviors logging subsystem configured to automatically log monitored behaviors within the respective section and a respective section alarming subsystem configured to automatically generate alarms for alarm worthy events within the respective section, wherein said routine anomalies and said emerging and possibly not routine anomalies are not catastrophic failures, the method comprising:

running a first section among said plural sections of the data processing system where the first section includes as its respective section alarming subsystem, a first section alarming subsystem and includes as its respective section behaviors logging subsystem, a first section behaviors logging subsystem, the first section alarming subsystem being configured to generate alarms for non-catastrophic alarm-worthy events detected within the first section, the section behaviors logging subsystem being configured to generate a log of monitored behaviors within the first section;

logically co-associating recently logged behaviors of the generated log produced by the first section behaviors logging subsystem with substantially cotemporaneous alarms generated by the first section alarming subsystem;

building an annotated log comprised of the logically co-associated logged behaviors and the substantially cotemporaneous alarms;

using the annotated log to update a corresponding anomalies versus parameters first mapping space populated by sample points representing previously identified as routine anomalies of the first section of the data processing system by adding recent, alarm-including sample point entries from the annotated log into the first mapping space as recently logged ones of alarmed sample points (ASP's);

determining if the recently logged ASP's map into a first region of the first mapping space occupied by older ASP's associated with the identified as routine anomalies or if the recently logged ASP's map into a different region of the first mapping space, where the ASP's which map into the different region can represent newly emerging and possibly non-routine anomalies;

automatically repeating said logically co-associating step, said building step, said using step and said determining step while the first section of the data processing system continues to run; and automatically responding to said determining that the recently logged ASP's map into the different region and can thus represent newly emerging and possibly non-routine anomalies that could be of significance to operations of the data processing system, the automatic responding being separate from responses to known-to-be-routine anomalies and separate from responses to detected catastrophic failures.

2. The machine-implemented method of claim 1 and further comprising:

using the annotated log for creating a behavior mimicking model of the first section alarming subsystem, the behavior mimicking model having accessible internal logic structures configured to mimic output behaviors of the first section alarming subsystem.

3. The machine-implemented method of claim 1 wherein:

the anomalies versus parameters first mapping space is defined by a database storing first data representing the alarmed sample points (ASP's) as points within a multi-parameters coordinate space where each alarmed sample point (ASP) correlates to one or more of the temporally corresponding generatings of alarms by the first section alarming subsystem.

4. The machine-implemented method of claim 3 wherein:

the anomalies versus parameters first mapping space is further defined by the database further storing second data representing non-alarmed sample points (NASP's) as points within the multi-parameters coordinate space where each non-alarmed sample point (NASP) correlates to an event logging time when there are no temporally corresponding generatings of alarms by the first section alarming subsystem.

5. The machine-implemented method of claim 3 wherein:
in addition to its respective one or more local data processing units and its respective one or more local data storage units, the first section of the data processing system includes a first data input/output communicating unit; and
the recently logged behaviors of the generated log include a data processing rate of at least one of the respective local data processing units, a data access rate of at least one of the respective local data storage units and a data communicating rate of the first data input/output communicating unit.

6. The machine-implemented method of claim 5 wherein:
the first section alarming subsystem of the first section generates a low storage access rate alarm when the data access rate of the at least one of the respective local data storage units is below a predetermined first storage access rate threshold.

7. The machine-implemented method of claim 6 wherein:
the first section alarming subsystem of the first section generates a high storage access rate alarm when the data access rate of the at least one of the respective local data storage units is above a predetermined second storage access rate threshold.

8. The machine-implemented method of claim 7 wherein:
the first section alarming subsystem of the first section does not normally generate a storage access rate alarm when the data access rate of the first data storage unit is between the predetermined first and second storage access rate thresholds; and
in response to the section alarming subsystem not generating the storage access rate alarms, the anomalies versus parameters first mapping space is defined within the database by a corresponding storing of non-alarmed data access sample points (daNASP's) as points within the multi-parameters coordinate space where each such corresponding non-alarmed data access sample point (daNASP) correlates to a time when there are no generatings of data access alarms by the first section alarming subsystem.

9. The machine-implemented method of claim 8 wherein:
an emerging data access anomaly is flagged for an area of the anomalies versus parameters first mapping space when that area was previously mapped as having only non-alarmed data access sample points (daNASP's) and there is a current change wherein the area starts being filled with alarmed data access sample points (daASP's) indicative of generatings of data access alarms by the first section alarming subsystem for that previously not-alarmed area of the anomalies versus parameters first mapping space.

10. The machine-implemented method of claim 3 and further comprising:
cotemporaneous with the running of the first section, running a second section of the data processing system where the first and second sections are operatively influential one at least on the other or the first and second sections are operatively influenced by a third section of the data processing system and where the second section includes as its respective section alarming subsystem, a second section alarming subsystem and includes as its respective section behaviors logging subsystem, a second section behaviors logging subsystem, the second section alarming subsystem being configured to generate alarms for alarm-worthy events detected within the second section, the second section behaviors logging subsystem being configured to generate a corresponding second log of monitored behaviors within the second section;
logically co-associating recently logged behaviors of the generated second log produced by the second section behaviors logging subsystem with substantially cotemporaneous alarms generated by the second section alarming subsystem of the second section of the data processing system;
building an annotated second log that correlates the recently logged behaviors of the second section to temporally corresponding generatings and non-generatings of alarms by the second section alarming subsystem;
using the second annotated log to update a corresponding anomalies versus parameters second mapping space of previously identified anomalies of the second section of the data processing system by adding recent, alarm-including sample point entries from the second annotated log into the second mapping space as recently logged ones of alarmed sample points (ASP's);
determining if the recently logged ASP's map into a respective first region of the second mapping space occupied by older ASP's associated with the identified as routine anomalies for the second section or if the recently logged ASP's map into a respective different region of the second mapping space, where the ASP's which map into the respective different region can represent newly emerging and possibly non-routine anomalies;
automatically repeating for the second section of the data processing system, said respective logically co-associating step, said respective building step, said respective using step and said respective determining step while the second section of the data processing system continues to run;
automatically responding to said determining for the second section that the recently logged ASP's map into the different region for the second section and can thus represent newly emerging and possibly non-routine anomalies for the second section that could be of significance to operations of the data processing system, the automatic responding for the second section being separate from responses to known-to-be-routine anomalies and separate from responses to detected catastrophic failures; and
automatically correlating changes in one of the first and second mapping spaces with cotemporaneous changes in the other of the first and second mapping spaces.

11. The machine-implemented method of claim 1 wherein for a case in which said automatic repeating of the logical co-associating step, of the building step and of the using step causes a region within the first mapping space that was previously free of a specific type of logged ASP's to start to become filled with the specific type of logged ASP's, automatically deeming the previously free region to be a region routinely populated by the specific type of logged ASP's.

12. The machine-implemented method of claim 1 wherein the automatic responding to said determining that the recently logged ASP's map into the different region comprises:
determining from placement of the recently logged ASP's into the different region that the recently logged ASP's indicate a problem within the first section that can be ameliorated by re-allocation of a particular type of resource; and re-allocating the particular resource so as to ameliorate the problem within the first section.

13. The machine-implemented method of claim 1 wherein the re-allocating of the particular resource so as to ameliorate the problem within the first section comprises:

adding one or more storage units to the first section.

14. The machine-implemented method of claim 1 wherein the re-allocating of the particular resource so as to ameliorate the problem within the first section comprises:

adding one or more data processing units to the first section.

15. A data processing system configured to separately deal with emerging and possibly not routine anomalies of the data processing system that could be of significance to continuing operations of the data processing system, wherein said routine anomalies and said emerging and possibly not routine anomalies are not catastrophic failures, the data processing system being subdivided into a plurality of sections with each section comprising intercoupled local resources including one or more local data processing units and one or more local data storage units, wherein two or more of the plural sections each respectively includes a respective section behaviors logging subsystem configured to automatically log monitored behaviors within the respective section and generate a respective local log and each of the two or more sections respectively includes a respective section alarming subsystem configured to automatically generate alarms for alarm worthy events within the respective section, the data processing system comprising:

an annotated logs storing database storing one or more respective annotated logs that respectively indicate correlations for respective ones of the system sections between recently logged behaviors of the respective system sections as recently recorded in the respective local log of the respective section and temporally corresponding generatings and non-generatings of alarms by the respective section alarming subsystems of the respective system sections;

an annotated logs builder, coupled to the database and configured to automatically repeatedly for respective ones of the system sections, add to the respective stored and annotated logs of the respective system sections additional samples of correlations between recently logged behaviors logged in the respective local logs and temporally corresponding generatings and non-generatings of alarms by the respective section alarming subsystems of the respective sections; and a post-process analytics portion of the data processing system that is operatively coupled to respective ones of the annotated logs stored in the database for the respective sections and is configured to automatically repeatedly map into respective anomalies versus parameters mapping spaces of respective ones of the system sections, sample point indicators indicative of respective coordinates in the respective mapping space corresponding to plural parameters associated with each generating and non-generating of alarms by the respective section alarming subsystem of the respective one among the sections and corresponding to substantially cotemporaneous, recently logged behaviors of the respective local log produced by the section behaviors logging subsystem of that respective section;

wherein the post-process analytics portion is configured to flag out abnormal changes over time in the automatically repeatedly made mappings of the sample point indicators into the respective anomalies versus parameters mapping spaces, where the flagged out abnormal changes include those representing emerging and possibly not routine anomalies that are not catastrophic failures.

16. The data processing system of claim 15 wherein:

the sample point indicators of the anomalies versus parameters mapping spaces include alarmed sample points (ASP's) that each indicates an association between its corresponding alarmed entry in the annotated log of the respective system section and cross-correlated coordinates within the respective multi-parameters coordinate space, where each such indicated as-alarmed sample point correlates to one or more of cotemporaneous ones of temporally corresponding generatings of alarms by the respective section alarming subsystem of the respective section.

17. The data processing system of claim 16 wherein:

the sample point indicators of the respective anomalies versus parameters mapping spaces further include non-alarmed sample points (NASP's) that each indicates as coordinates within the respective multi-parameters coordinate space, where each such NASP sample point correlates to one or more of cotemporaneous ones of temporally corresponding non-generatings of alarms by the respective section alarming subsystem of the respective section.

18. A machine-implemented method for adaptively and separately responding to emerging and potentially non-routine anomalies of a running data processing system that also experiences routine anomalies, wherein said routine anomalies and said emerging and possibly not routine anomalies are not catastrophic failures, the method comprising:

running each of plural and inter-coupled sections of the data processing system where each respective section includes a respective section alarming subsystem and a respective section behaviors logging subsystem, the respective section alarming subsystem being configured to generate alarms for non-catastrophic alarm-worthy events within the respective section, the respective section behaviors logging subsystem being configured to generate a log of monitored behaviors within the respective section;

for each respective one of the running sections which has not experienced a catastrophic failure and thus is running, respectively co-associating recently logged behaviors of the respectively generated log produced by the respective section behaviors logging subsystem with substantially contemporaneous alarms generated by the respective section alarming subsystem;

for each respective one of the running sections, building a respective annotated log that includes the co-associations made between the recently logged respective behaviors and the respective temporally corresponding generatings and non-generatings of alarms by the respective section alarming subsystem;

for each respective one of the running sections, using the respective annotated log to update a respective anomalies versus parameters mapping space by adding to that respective mapping space recent, alarm-including sample point entries from the respective annotated log as recently logged ones of alarmed sample points (ASP's) of the respective section of the data processing system;

for each respective one of the running sections, determining if the recently logged ASP's map into a region of the respective mapping space occupied by older ASP's associated with identified as routine anomalies or if the recently logged ASP's map into a different region of the respective mapping space, where the ASP's which map into the different region can represent newly emerging and possibly non-routine anomalies; and automatically repeating for each respective one of the running sections, said respective co-associating step, said respective building step, said respective using step and said respective determining step;

keeping track in each of the respective anomalies versus parameters mapping spaces of changes over time in the mapping locations of and/or the rates of sample point additions by the respective alarm-including sample point entries to the respective anomalies versus parameters mapping spaces; and adaptively reallocating resources to respective ones of the running sections based on the tracked changes within the respective anomalies versus parameters mapping spaces.

19. The machine-implemented method of claim 18 wherein:

the adaptively reallocating of resources includes automatically repeatedly determining for each tracked section if a per unit usage is above a predetermined maximum threshold for such a unit such that a predetermined desired margin of safety of the respectively tracked section is compromised and in response to a determining that the per unit usage is above the corresponding predetermined maximum threshold, adding a further such unit to the respective section.

20. The machine-implemented method of claim 18 and further comprising:

building one or more hierarchical parent annotated logs that include the co-associations made between the recently logged respective behaviors and the temporally corresponding generatings and non-generatings of alarms by the respective section alarming subsystems of two or more of the system sections.

* * * * *